US006996457B2

(12) United States Patent
Williams et al.

(10) Patent No.: US 6,996,457 B2
(45) Date of Patent: *Feb. 7, 2006

(54) IRRIGATION CONTROLLER WITH REMOVABLE STATION MODULES

(75) Inventors: Jonathan D. Williams, Riverside, CA (US); Peter M. F. Tam, Irvine, CA (US)

(73) Assignee: The Toro Company, Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/887,367

(22) Filed: Jul. 6, 2004

(65) Prior Publication Data

US 2004/0254685 A1 Dec. 16, 2004

Related U.S. Application Data

(63) Continuation of application No. 10/198,849, filed on Jul. 19, 2002, now Pat. No. 6,772,050, which is a continuation of application No. 09/400,031, filed on Sep. 21, 1999, now Pat. No. 6,459,959, which is a continuation of application No. 08/904,125, filed on Jul. 28, 1997, now Pat. No. 5,956,248, which is a continuation of application No. 08/312,268, filed on Sep. 23, 1994, now abandoned.

(51) Int. Cl.
*G06D 7/06* (2006.01)

(52) U.S. Cl. ............................ 700/284; 700/19; 239/69
(58) Field of Classification Search .................. 700/11, 700/14, 16, 18, 19, 23, 25, 284; 137/78.2; 239/69, 70

See application file for complete search history.

(56) References Cited

U.S. PATENT DOCUMENTS

| 3,869,854 A | * | 3/1975 | Church ........................ 368/156 |
| 4,090,764 A | * | 5/1978 | Malsby et al. ............... 439/471 |
| 4,152,750 A | * | 5/1979 | Bremenour et al. ........ 361/686 |
| 4,569,020 A | * | 2/1986 | Snoddy et al. .............. 700/284 |
| 4,852,051 A | * | 7/1989 | Mylne, III .................. 700/284 |
| 4,937,732 A | * | 6/1990 | Brundisini .................... 700/16 |
| 5,262,936 A | * | 11/1993 | Faris et al. .................... 700/11 |
| 5,293,554 A | * | 3/1994 | Nicholson ................... 700/284 |
| 5,410,717 A | * | 4/1995 | Floro ......................... 710/104 |
| 5,479,338 A | * | 12/1995 | Ericksen et al. .............. 700/16 |
| 5,602,728 A | * | 2/1997 | Madden et al. ............... 700/16 |
| 6,772,050 B2 | * | 8/2004 | Williams et al. ............ 700/284 |

OTHER PUBLICATIONS

The Strong Box, Stainless Steel Controller Enclosure, 10 pgs., V.I.T. Products, Inc., San Diego, CA, 1991.
Rain Bird, Central Control System, Maxicom, Jun., 1994, pp. 2-8, Rain Bird Sales, Inc., Tucson, AZ.

(Continued)

*Primary Examiner*—Paul Rodriguez
(74) *Attorney, Agent, or Firm*—Inskeep IP Group, Inc.

(57) ABSTRACT

An irrigation controller includes a housing for enclosing a microprocessor that stores and executes at least one watering program. The microprocessor has a parallel output bus with a plurality of pin sets for controlling a plurality of irrigation stations. The connection between the controller and the irrigation stations is through a plurality of station modules that are removably coupled, in any desired number, to the various pin sets on the output bus. The number of stations controlled is adjusted by the number of modules connected to the output bus. The controller housing has a pocket for holding a user's manual, which is positioned between the controller housing and a mounting bracket when the controller housing is installed on the mounting bracket.

14 Claims, 5 Drawing Sheets

OTHER PUBLICATIONS

Rain Bird, Components of the Maxicom System, Feb. 9, 1994, p. 3.2, Section 3, US.

Rain Bird, Central Control System, Maxicom—Guide to Operations, Feb., 1993, TOC and pp. 5.4-1-5.4-2; 5.4-41-5.4-42;7.2-1-7.2-2; Rain Bird Sales, Inc., Tucson, AZ.

Rain Bird, Maxicom Guide to Operations, Oct., 1994, Chapter 7, US.

Rain Bird, Central Computer Control System, Maxicom, "Landscape Irrigation Products, 1993-1994 Catalog", pp. 98-99, US.

TORO, Motorola MIR 5000 Radio-Based Irrigation Central Computer Control System, 1991, pp. 1-4, The Toro Company, Riverside, CA.

MOTOROLA, MIR5000 System Planner, Mar. 8, 1993, TOC and pp. 1-42, The Toro Company, Riverside, CA.

MOTOROLA, Motorola MIR5000 System Features, Nov. 1991, 20 Pgs., San Diego Turf & Irrigation, San Diego, CA.

MOTOROLA, Motorola MIR-5000 Component Descriptions, Feb. 16, 1993, 5 pgs., Megeath.

MOTOROLA, New Members to the MIR5000 Family, Irrinet and Scorpio, 14 pgs., Toro, Riverside, CA.

Toro/Motorola, General Description—IRRInet, 24 pgs., Toro, Riverside, CA.

MOTOROLA, IRRInet Owner's Manual, 1992, TOC and Secs. 1-3, Motorola Communications Israel Ltd., Tel Aviv, Israel.

MOTOROLA, IRRInet Component Descriptions, Feb. 16, 10 Pgs., 1993, Megeath.

MOTOROLA, Irrigation Field Unit Owner's Manual, TOC and Secs. 1-3, 1992, Technical Writing Services, Motorola, Inc., Schaumburg, IL.

MOTOROLA, Scorpion AC, TOC and Secs. 1-3, Sep., 1994, Technical Writing Services, Motorola, Inc., Schaumburg, IL.

MOTOROLA, IRRInet General Description Service Manual, 16 pgs., 1993, Technical Writing Services, Motorola, Inc., Schaumburg, IL.

MOTOROLA Communications Sector, I/O Module 4 Digital Inputs/16 Solid-State Outputs, 1992, 12 pgs., Technical Writing Services, Motorola, Inc., Schaumburg, IL.

MOTOROLA, MIR5000C Quickstart and Reference Guide, Feb. 1994, Technical Writing Services, Motorola, Inc., Schaumburg, IL.

MOTOROLA, MIR5000C Central System Operating Instructions, 1991, Technical Writing Services, Motorola Communications Israel Ltd., Tel Aviv, Israel.

MOTOROLA, MIR 5000C System Installation Section, 1989, Technical Writing Services, Motorola Communications Israel Ltd., Tel Aviv, Israel.

Koala-T Irrigation Controller Photos, P1010983 thru P1010989, Oasis Control Systems, Inc., Chatsworth, CA.

* cited by examiner

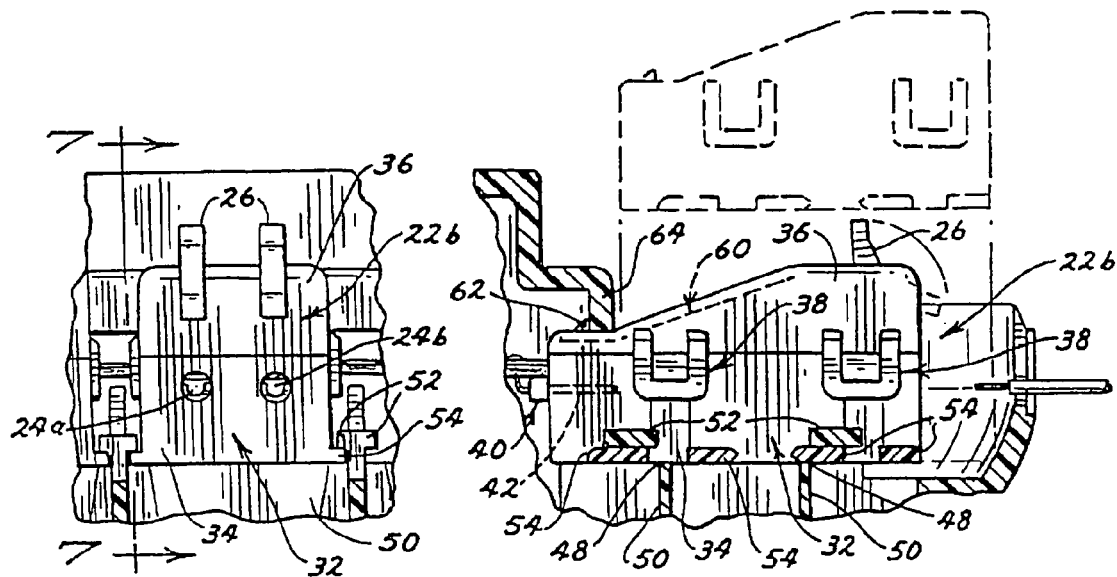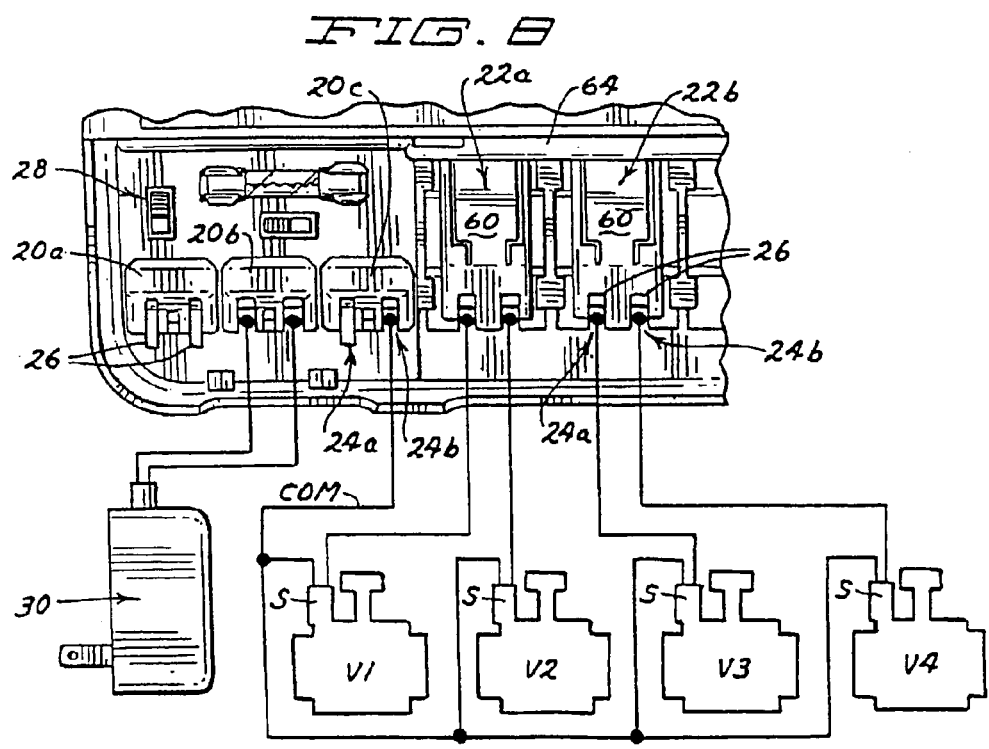

IRRIGATION CONTROLLER WITH REMOVABLE STATION MODULES

CROSS REFERENCE TO RELATED APPLICATIONS

The present application is a continuation of U.S. patent application Ser. No. 10/198,849, filed Jul. 19, 2002; now U.S. Pat. No. 6,772,050; which is a continuation of U.S. patent application Ser. No. 09/400,031, filed Sep. 21, 1999, now U.S. Pat. No. 6,459,959; which is a continuation of Ser. No. 08/904,125, tiled Jul. 28, 1997, now U.S. Pat. No. 5,956,248; which is a continuation of Ser. No. 08/312,268, filed Sep. 23, 1994, now abandoned.

TECHNICAL FIELD

This invention relates to an irrigation controller for controlling the operation of an irrigation system pursuant to a watering schedule that may be programmed by the user. More particularly, this invention relates to an irrigation controller for controlling multiple irrigation stations.

BACKGROUND OF THE INVENTION

Irrigation controllers are known for controlling the operation of an irrigation system in accordance with the passage of time. Most controllers operate a plurality of watering stations and will retain or store a watering program established by the user. This program typically allows the user to pick what days the sprinklers will operate, what time of day that irrigation will begin, and how long each station will operate. Some controllers allow multiple watering programs to be stored.

U.S. Pat. No. 5,262,936 discloses a microprocessor based controller in which the controller base unit has drivers and switches for controlling some number of irrigation stations that is less than the maximum number that can be controlled. The station handling ability of the controller can be expanded by plugging in additional modules with each module having drivers and switches for an additional number of stations. The modules when connected extend and are part of a serial bus structure in the controller. The modules known in this prior controller are quite large and when connected to the base unit of the controller take up considerable space exteriorly of the base unit, leading to problems in finding sufficient space to receive them all and in attaching all of the modules in a secure fashion.

SUMMARY OF THE INVENTION

This invention relates to an irrigation controller which comprises a housing having microprocessor means for storing and executing a watering program for controlling a plurality of irrigation stations. The microprocessor means includes a parallel output bus within the housing having a plurality of separate station output pins for controlling the irrigation stations with one station output pin used for controlling each station. At least one module is removably plugged into at least one of the station output pins on the output bus. The module has a terminal suited for receiving an electrical lead wire extending to the irrigation station, and further has driver and switch means for activating the station as commanded by the base unit over the at least one station output pin.

BRIEF DESCRIPTION OF THE DRAWINGS

This invention will be described in more detail in the following Detailed Description, taken in conjunction with the following drawings, in which like reference numerals refer to like elements throughout.

FIG. 6 is an enlarged front elevational view of one of the station modules of the controller with the module shown installed in the controller of FIG. 1;

FIG. 7 is a cross-sectional view taken along lines 7—7 of FIG. 6, particularly illustrating how the station module is installed in the controller of FIG. 1;

FIG. 8 is a partial front elevational view of the controller shown in FIG. 1, with the terminal strip cover being removed to show two station modules for controlling four irrigation stations and the rain sensor, 24 V AC and pump and common outputs contained on the terminal strip.

DETAILED DESCRIPTION

Figure 2:
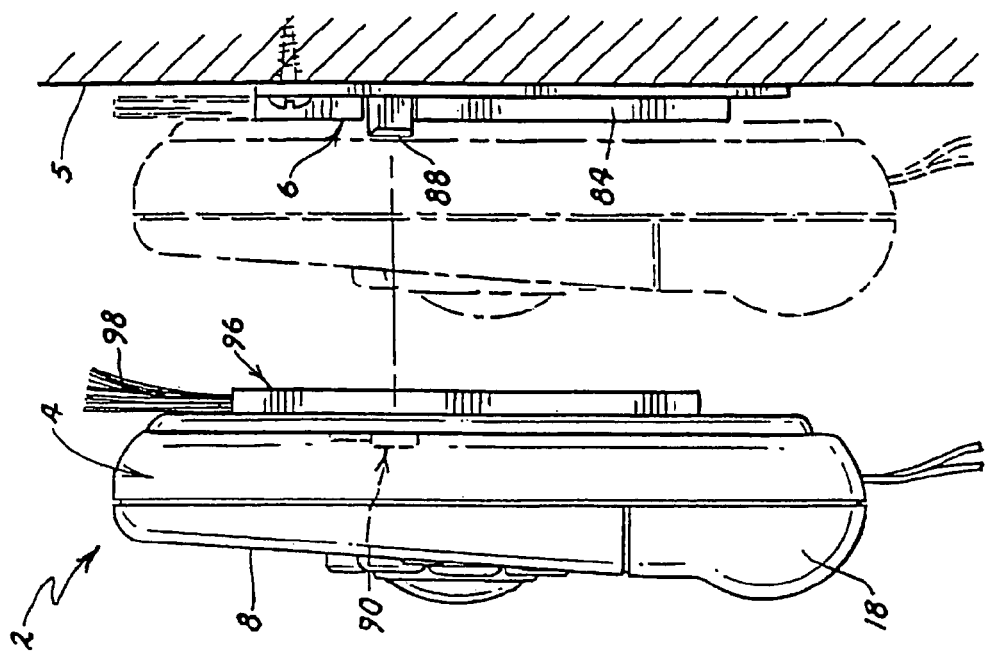
FIG. 2 is a side elevational view of the controller shown in FIG. 1, particularly illustrating the controller housing and its attachment to a mounting bracket on which the controller housing is removably installed.

This invention relates to an irrigation controller 2 for controlling the operation of an irrigation system in a timed manner. More specifically, controller 2 allows the user to select or input at least one watering program comprising the following parameters of irrigation system operation:

which days the sprinklers will operate in a particular 7 day window (i.e. a calendar sequence) or the interval between successive operational days up to a maximum interval of 7 days (i.e. an interval sequence), the operational days being known as "active days";

when the sprinklers come on during the active days, known as the "start times", with up to four start times being selectable; and how long the sprinklers will run after each start, known as the "run times".

Controller 2 is adapted to control a plurality of separate watering "stations" in the irrigation system. Each station comprises one or more sprinklers grouped together to operate simultaneously off the same irrigation valve V. Each irrigation valve V includes an actuator, such as an electrical solenoid S, which is operated by a control signal from controller 2 to turn valve V on.

Controller 2 of this invention can be easily adapted to control different numbers of stations up to a total of eight stations. A four station controller 2 is illustrated in this application. Referring to FIG. 8, the four stations are illustrated by the four separate irrigation valves V1, V2, V3 and V4 wired to controller 2. There will be six irrigation valves V1–V6 wired to controller 2 in a six station controller, eight valves V1–V8 in an eight station controller, and so on. While eight is the maximum number of stations that can be controlled by controller 2 shown herein, the maximum number of stations can obviously be adjusted to a larger number if so desired.

For each watering program stored in controller 2, a run time may be set individually for each separate station, i.e. different stations may have different run times depending on operator preference. However, the selections of active days and start times apply to all stations as a group within each watering program. Thus, when an active day and start time is reached when executing a particular watering program, controller 2 will operate the irrigation system by sequencing through the stations and operating each station for the run time which has been set for that station on that particular program. Sequential operation of the stations is preferred to decrease the demands on the water delivery capacity of the irrigation system.

Controller 2 incorporates a microprocessor (not shown) of any suitable design which comprises a timing, memory, logic and control means. The microprocessor monitors the passage of time and executes whatever watering program has been input and selected by the user for execution. Operational flexibility is achieved by allowing controller 2 to store and execute multiple watering programs so that a different combination of active days, start times, and run times can be stored in different programs if so desired. The microprocessor can also permanently store a default watering program for use if the user fails to input a customized watering program or programs of the user's own design.

Typical irrigation controllers based on the use of microprocessors are disclosed in U.S. Pat. Nos. 5,262,936 and 5,272,620, owned by the assignee of this application. These patents are hereby incorporated by reference.

Figure 1:
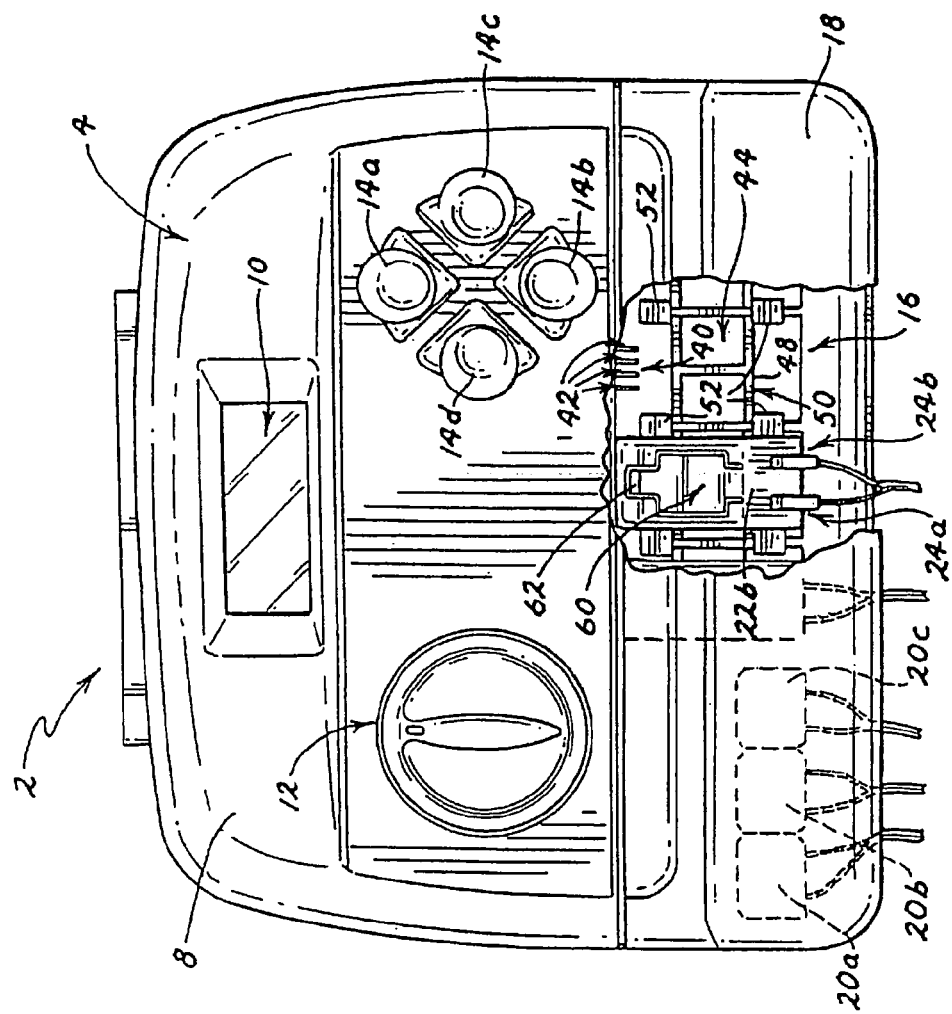
FIG. 1 is a front elevational view of an improved irrigation controller according to this invention, particularly illustrating the controller housing and front panel with its associated controls and displays and having a portion of the controller broken away to illustrate one of the removable station modules installed inside the controller housing.
Figure 3:
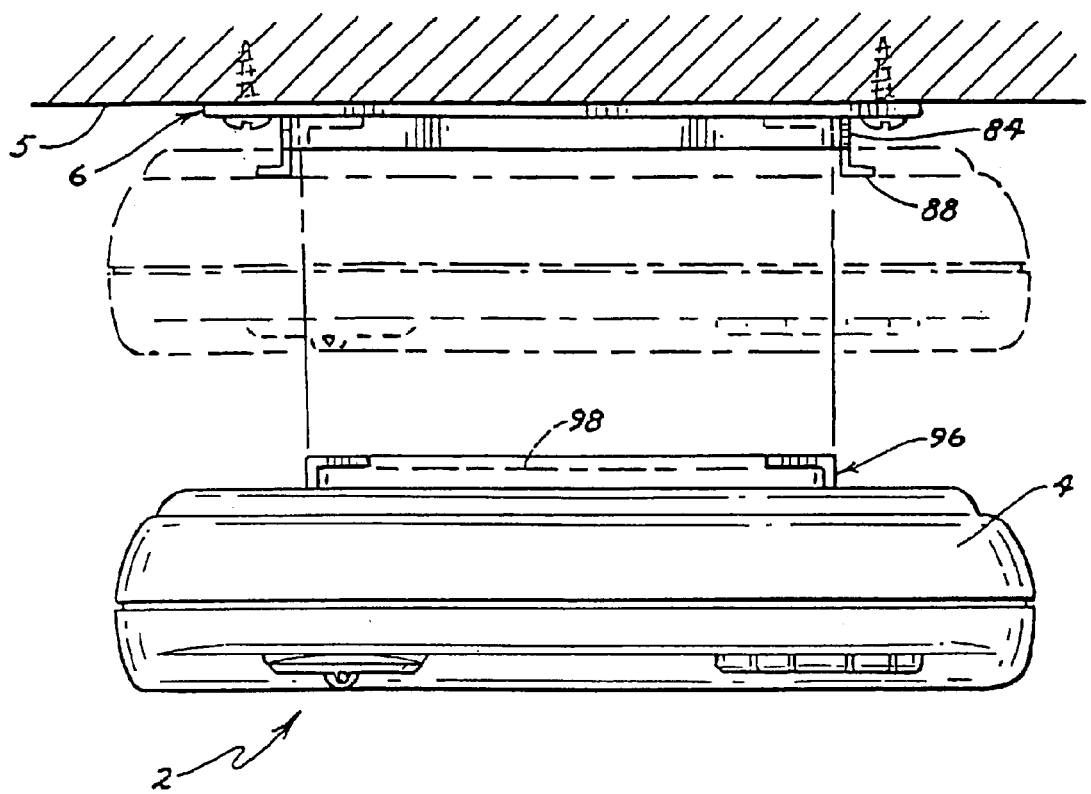
FIG. 3 is a top plan view of the controller shown in FIG. 1, particularly illustrating the controller housing and its mounting bracket.

Referring to FIG. 1, the electronic components of controller 2, including the microprocessor, are contained within a housing 4 of any suitable design. As will be described in more detail hereafter, housing 4 may be mounted on a wall 5 using a mounting bracket 6. Housing 4 includes a front panel 8 having various operational controls which may be manipulated by the user to activate control functions of controller 2 or to input information into controller 2. In addition, controller 2 includes a display device 10 for displaying information to the user.

The operational controls of controller 2 include a rotary knob or dial 12 for selecting various ones of the programmable parameters that can be input and stored in a watering program, and various push button controls identified generally as 14. Push button controls 14 include "up/down" or "plus/minus" keys 14a, 14b for incrementing or decrementing the value of a particular parameter when programming the controller, an "enter" key 14c for accepting a particular value of a parameter and for proceeding to the next step in the programming sequence, and an "escape" key 14d to start over during programming. Thus, by rotating dial 12 to a particular position corresponding to a particular parameter that can be input, the user can then manipulate controls 14 to input and store values for the selected parameter while observing in display device 10 the values as they are being input for that parameter through the operation of controls 14.

The type of watering program stored in controller 2, namely the number and nature of the parameters that can be set and stored in a watering program and then executed by controller 2, can obviously be varied. In addition, the nature of the operational controls 12, 14 used to input the watering program or access the features of controller 2 can also obviously be changed. This invention relates to other features of controller 2, to be described in detail hereafter, that can be used generally on any irrigation controller that controls a plurality of stations, without being limited to controller 2 as shown herein.

A lower portion of controller 2 houses an input/output terminal area, identified generally as 16, behind an easily removable access strip or panel 18. Panel 18 is configured to snap onto and off of controller housing 4 using known tab and slot connections. Terminal area 16 includes space for three, terminal blocks 20a, 20b, and 20c which are hardwired into place. In addition, terminal area 16 includes space for up to four, two-station modules 22a, 22b, etc. that are used to connect controller 2 to the irrigation stations comprising valves V. Station modules 22 are generally identical to one another and are easily removable from controller 2—modules 22 simply plug into controller 2 and can be easily unplugged from controller 2 in a manner to be described shortly, Terminal blocks 20 and station modules 22 each have two snap-in wire terminals 24a, 24b therein for receiving two connecting wires. Such terminals are well known in the electrical connection art. They each have a pivotal lever 26 that may be rotated 90° from an open position (where lever 26 is vertical and the wire may be inserted into the terminal) to a generally closed position (where lever 26 is horizontal and the wire is clamped or retained in the terminal). The use of such snap-in wire terminals is preferred as it eases the task of connecting the necessary wires to controller 2. Other quick coupling devices could be used, or conventional screw type terminals could be used, in place of snap-in terminals 24a, 24b.

The nature of the wires that are connected to the various terminal blocks 20 and station modules 22 will vary. For example, the first terminal block 20a connects to the two lead wires of a rain switch (not shown) which determines if it is raining and allows controller 2 to cease operation in the case of rain. A typical rain switch of the type which may be connected to terminal block 20a is described in U.S. Pat. No. 5,101,083, which is hereby incorporated by reference. An on/off switch 28 can be mounted in terminal area 16 immediately above terminal block 20a for the rain switch. In the off position of switch 28, the rain switch input is ignored by controller 2 such that the detection of rain will not affect the operation of controller 2 or the irrigation system.

The second terminal block 20b is used for the convenient connection of an external electrical transformer 30 used to provide AC power to controller 2. Transformer 30 will be wired or plugged into a standard AC power source such as 120V AC power, and will provide 24V AC power to controller 2. Ultimately, such 24V AC power will be used to activate solenoids S on irrigation valves V. Additionally, such power can be routed through one of the terminals in terminal block 20c to activate a solenoid S on a master valve or a relay on an irrigation pump. This is required in irrigation systems where a source of pressurized water is not continually present upstream of valves V, but is provided only when irrigation is to take place. In this event, either a master valve supplying valves V must first be opened, or a pump started, to ensure supply of pressurized water to valves V.

The third terminal block 20c as noted above uses one of the snap-in terminals, namely terminal 24a, as a master valve or pump relay. output for supplying 24V AC power from controller 2 to these components. The other terminal 24b in terminal block 20c is used as a common wire connection COM to ground. Thus, all of the common wires for all of the irrigation valves V may be spliced together, as shown in FIG. 8, and connected to ground using the common wire terminal 24b in terminal block 20c. In addition, when operating a master valve or pump, the common wire for such master valve or pump may also be spliced into and connected to the common wire connection COM leading to common wire terminal 24b.

Station modules 22 are used to allow controller 2 to control a desired number of stations determined by the number of modules 22 that are installed. Each module 22 has two snap-in terminals 24a, 24b for controlling two stations, with each terminal being connected to the non-common wire lead from a solenoid S. A module 22 could be used to control only one station if only of the snap-in wire terminals 24a, 24b is connected to a single solenoid. However, if both terminals are being utilized, then each module 22 will control two stations, i.e. two of the irrigation valves V. See FIG. 8.

Controller 2 is provided with means for accepting up to a predetermined maximum number of modules 22 to control up to a predetermined maximum number of stations V. There is space in controller 2 for accepting up to four modules 22 side-by-side in terminal area 16, thus allowing up to eight stations to be controlled. If one module 22 is installed, then up to two stations can be controlled, with two modules 22 up to four stations can be controlled, and so on. FIG. 8 illustrates a configuration having two modules installed controlling four stations represented by the four irrigation valves V1–V4.

Referring to FIGS. 1, 6 and 7, each station module 22 includes a casing 32 having a generally rectangular base 34 secured to a tapered top 36. Base 34 and top 36 may be separable to allow a printed circuit board to be inserted into module 22 during manufacture, with base 34 and top 36 then being snapped together and held as a unit by suitable connectors 38. One end of module 22 includes the two snap-in wire terminals 24a, 24b representing the output end of module 22. The other or input end of module 22 has a plug connection for allowing module 22 to be plugged into one set 40 of four output pins 42 on a parallel output bus in controller 2. In each set 40 of pins 42, one pin is assigned to control one of the terminals 24a and 24b, respectively, another pin is a ground connection, and the remaining pin is a 5V power input to module 22. See FIG. 9. Thus, when module 22 is in place and is plugged into the parallel output bus, controller 2 will activate the stations connected to module 22 as called for by the watering program being executed by controller 2.

Terminal area 16 of controller 2 is provided with four slots 44 in which modules 22 are slidably received, with one slot 44 being provided for each module 22. Each slot 44 is formed by the upper aligned surfaces 48 of a plurality of spaced vertical walls 50 in terminal area 16, such surfaces 48 defining a plane against which the bottom of module 22 may be engaged. Each slot 44 further has two spaced overhanging lips 52 on either side thereof which are spaced from one another and are elevated above the upper aligned surfaces 48 of walls 50. Lips 52 are suited to slidably engage with a plurality of guide tabs 54 that jut out from the sides of modules 22 to guide modules 22 in slots 44.

As shown most clearly in FIG. 7, to insert a module 22 into one of the slots 44 in terminal area 16, module 22 is positioned as shown in phantom above slot 44 and with guide tabs 54 on modules 22 being located in the gaps between the spaced lips 52. Module 22 is then dropped downwardly until the bottom thereof rests on the upper aligned surfaces 48 of vertical walls 50. Module 22 is then pushed inwardly in slot 44 relative to the parallel output bus until the pin set 50 on the bus plugs into the connector provided therefor in the input end of module 22 as shown in solid lines in FIG. 7. In this position, guide tabs 54 on module 22 have slid beneath lips 52 on the sides of slots 44.

The top of each module is provided with means forming a spring biased latch. More specifically, this latch is provided by a section 60 of the top wall of module 22 that is cut away along its sides and rear but is joined to module 22 at the front, in effect being supported in the manner of a cantilever. This section 60 will have a natural outward biasing force which tends to keep this section 60 aligned with the remaining portions of the top wall of module 22. The rear of section 60 is provided with an upwardly protruding hook 62. Hook 62 is adapted to engage against the rear side of a vertical wall 64 that overlies the inner end of slot 44.

As module 22 is slid into place in a slot 44 (after it has been dropped into place in slot 44 with guide tabs 54 ready to be pushed beneath lips 52), hook 62 will be cammed down beneath wall 64 with the cut away top wall section 60 deflecting down as necessary to allow this movement. When hook 62 clears wall 64 as module 22 plugs into the pin set 40 on output bus, the cut away section 60 of the top wall 55 will spring back upwardly to its normal untensioned state where it is generally aligned with the remainder of the top wall. Thus, hook 62 and cut away section 60 of the top module wall form, in effect, a spring biased latch for firmly locking module 22 in place in slot 44.

To remove any particular module from its slot 44, the user simply presses down on the cut away section 60 of the top wall to disengage hook 62 from behind wall 64, and then pulls slightly outwardly on module 22 to clear guide tabs 54 from beneath lips 54 and to unplug module 22 from the output bus. Module 22 is then simply lifted up out of slot 44. Thus, the actions required to remove a module 22 are the reverse of those used to install module 22.

Figure 9:
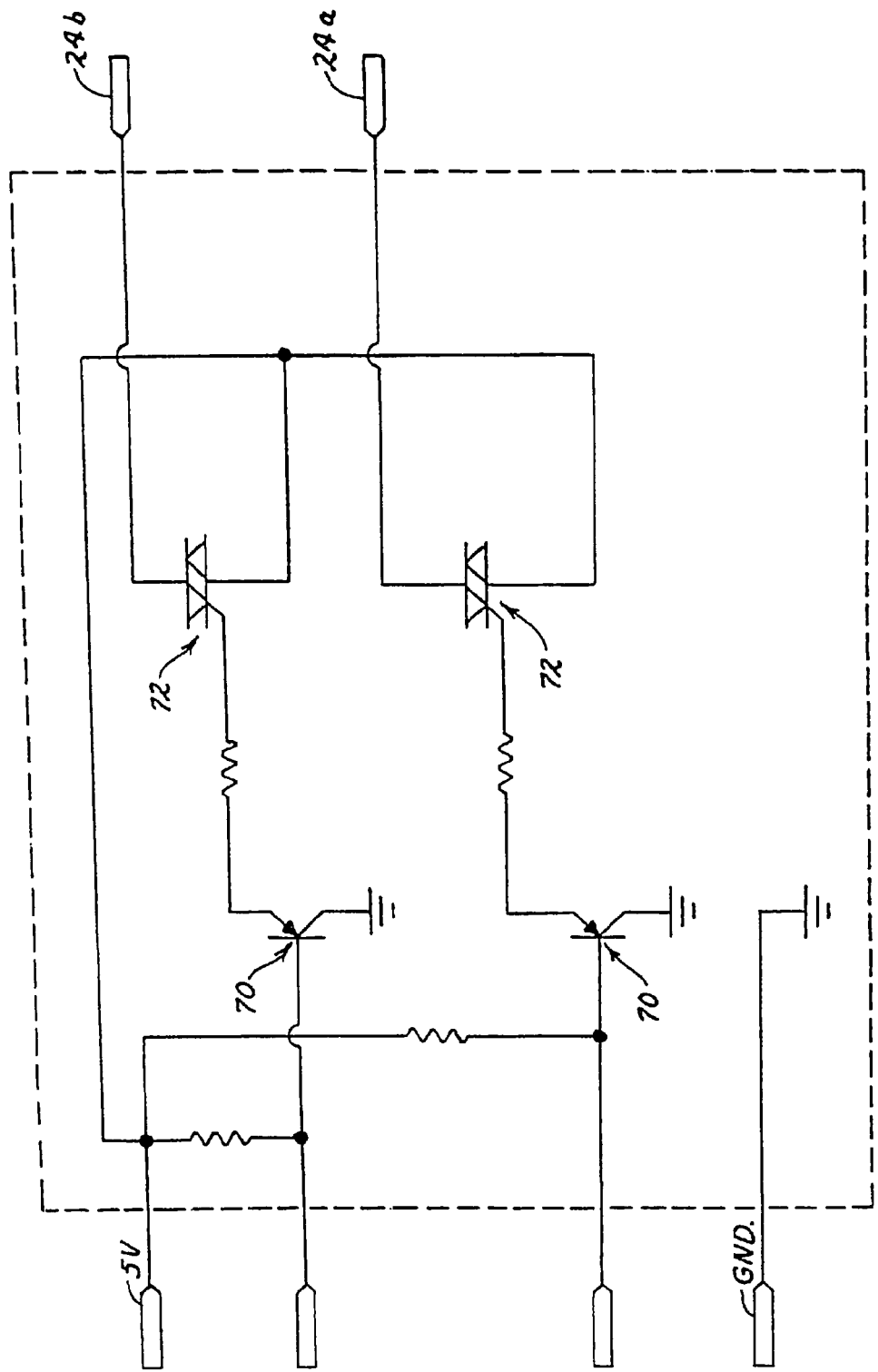
FIG. 9 is a schematic diagram of one of the station modules used in the controller of FIG. 1.

The electronic circuitry for activating the solenoid S on the valves V is contained on the printed circuit board that is carried within each module 22. Referring to FIG. 9, this circuitry comprises a transistor driver 70 for activating a TRIAC switching device 72. Each terminal 24a, 24b is connected to its own transistor/TRIAC combination 70/72. Thus, when controller 2 determines that a particular valve V should be opened, it does so by activating the appropriate transistor 70 to close the appropriate TRIAC 74, thus activating the solenoid of the appropriate valve.

Figure 4:
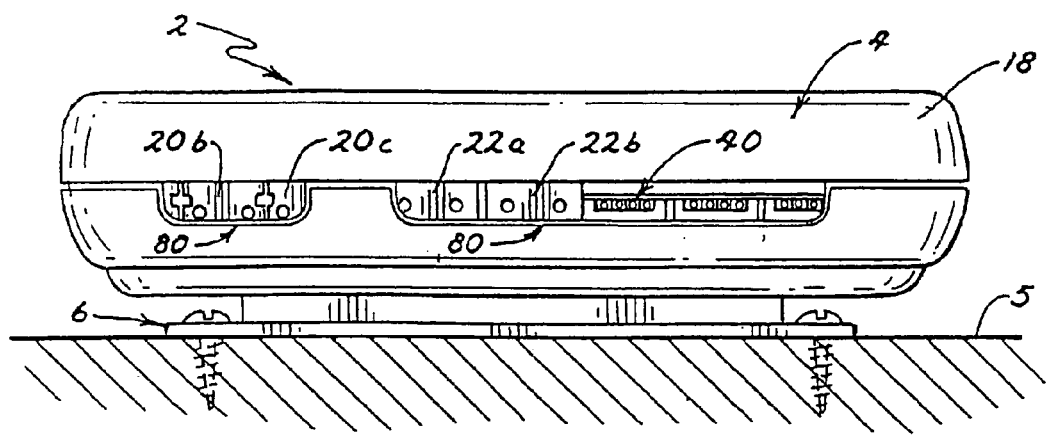
FIG. 4 is a bottom plan view of the controller shown in FIG. 1 with the controller housing in place on its mounting bracket.
Figure 5:
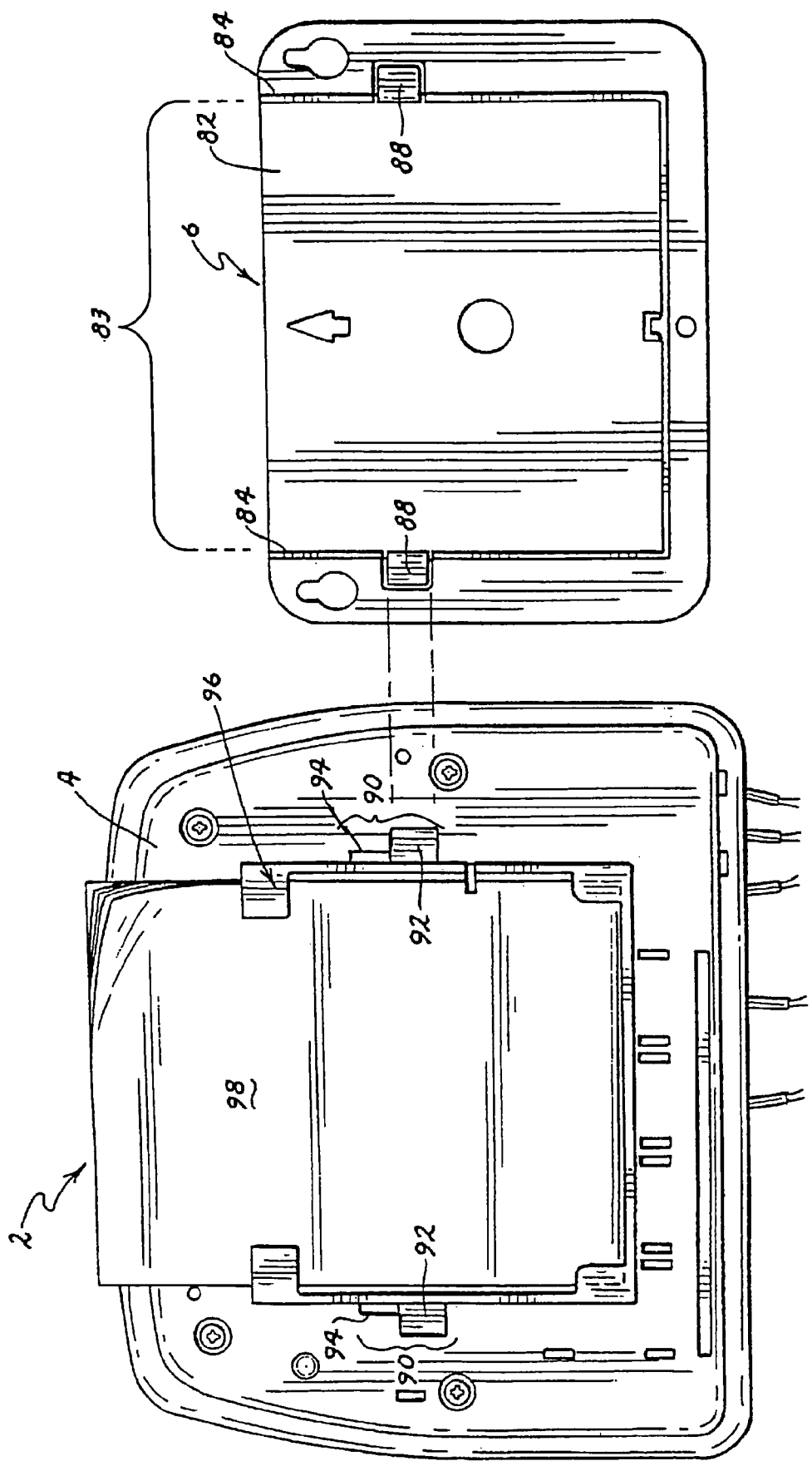
FIG. 5 is an exploded, rear elevational view of the controller shown in FIG. 1, particularly illustrating the controller housing detached from the mounting bracket and the pocket provided on the back of the controller housing for holding a use manual for the controller.

The use of plug in, removable station modules 22 for serving as the connection to the irrigation stations allows controller 2 to have great versatility. If only a four station controller is needed, only two modules 22 need be used. Thus, the user can tailor controller 2 to control precisely only those numbers of stations that are required for a particular irrigation system. In addition, modules 22 are all conveniently located within, and protected by, housing 4 of controller 2. Thus, controller 2 is compact and not unduly bulky. The bottom of controller housing 4 includes various ports or openings 80 for routing wires to and from terminal area 16 for connection to terminal blocks 20 or station modules 22. See FIG. 4.

The Applicants have found that controller 2 will have great resistance to lightning strikes that may induce surge currents on the station wires. In previous controllers, the energy from such a strike will often be conducted back to controller 2 along the wires connecting controller 2 to the particular station affected by the strike. Since these wires are usually connected directly to a terminal strip that is hard-wired to the main printed circuit board of controller 2, i.e. to the circuit board having the microprocessor controller, this energy could often damage many of the controller's components, including the microprocessor.

However, with modules 22 of the present invention, Applicants have found that much of the energy from a lightning strike will be absorbed by the electronic circuitry within module 22 without damaging the main printed circuit board in controller 2. Thus, while module 22 itself may be destroyed by the lightning strike, it is a simple matter to replace this module with a new one. This is an easy and inexpensive task compared to the cost of repairing or replacing the main circuit board of the entire controller 2.

Turning now to the mechanical mounting of controller 2 on the wall, the mounting bracket 6 includes a planar surface 82 that may be screwed or in some other way fixed to the wall. A pocket receiving space 83 is formed on this mounting bracket 82 which is bounded by two spaced side walls 84, by a bottom wall 86 and by the planar surface 82 of bracket 6. This space 83 has a predetermined depth determined by the depth of side walls 84. Each side wall 84 has an outwardly protruding tab 88 on the front side thereof spaced away from planar surface 82 by an appropriate distance.

The rear surface of controller 2 housing has a bayonet type slot structure 90 for receiving tabs 88 on mounting bracket 6. Basically, each tab 88 is initially received into an open rectangular portion 92 of slot 90, and controller housing 4 can then be slid down relative to mounting bracket 6 until tabs 88 are received behind wall portions 94 of slot 90. Thus, controller housing 4 can be removably attached to wall 5 using mounting bracket 6, and can be slid onto and off of mounting bracket 6 at will.

The rear surface of controller housing 4 includes a rearwardly protruding pocket 96 for holding a user's or operator's manual 98. The depth and size of pocket 96 is Sufficient to allow pocket 96 to be received in the pocket receiving space 83 provided on bracket 6 between side walls 84. Thus, when controller housing 4 is in place on mounting bracket 6, the space 83 between housing 4 and the planar surface 82 of mounting bracket 6 is used to conveniently store the user's manual 98. See the phantom line illustration in FIG. 2.

It is a great advantage to have the user's manual located in a readily accessible manner on controller 2 housing. The user need not go look for the manual in some remote space when some question arises as to the programming or operation of controller 2. In addition, the manual storage is done in an out-of-the way, unobtrusive location, thus enhancing the probability that it will be used for this purpose.

Various modifications of this invention will be apparent to those skilled in the art. Thus, the scope of this invention is to be limited only by the appended claims.

What is claimed is:

1. A method of controlling water irrigation comprising:
   providing a microprocessor to selectively turn on and off a plurality of watering stations according to a programmable timing pattern;
   providing a collection of watering station activation modules, each of said watering station activation modules configured for direct independent connection to said microprocessor; said collection having at least two watering station activation modules which interchangeably connect with said microprocessor and wherein each of said at least two watering station activation modules activate a same number of said plurality of watering stations;
   determining a number of watering stations necessary for a particular watering site;
   selecting a sufficient number of watering station activation modules from said collection for activation of said number of watering stations necessary for a particular watering site;
   inserting each of said sufficient number of watering station activation modules into a separate corresponding compartment associated with said direct independent connection to said microprocessor;
   allowing said microprocessor to detect the number of watering station activation modules connected to said microprocessor and thereby to detect a number of watering stations capable of activation;
   connecting said number of watering stations necessary for a particular watering site to said sufficient number of watering station activation modules; and
   causing said microprocessor to execute turning on and off of said number of watering stations necessary for a particular watering site according to said timing pattern; and,
   determining that additional watering stations are necessary;
   selecting at least one additional watering station activation module from said collection;
   inserting said additional watering station activation module into a separate corresponding compartment associated with said microprocessor without disturbing any previously inserted watering station activation modules; and
   allowing said microprocessor to detect the presence of said at least one additional activation module.

2. A method according to claim 1, further comprising:
   determining that less watering stations are necessary;
   disengaging at least one of said watering station activation modules from said separate corresponding compartment associated with said microprocessor without disturbing any previously inserted watering station activation modules; and
   allowing said microprocessor to detect the disengaging of said at least one activation module.

3. A method according to claim 1, wherein the providing of a collection of watering station activation modules includes providing watering station activation modules that activate at least two watering stations.

4. A method of adapting an irrigation control apparatus to control a number of irrigation stations comprising:
   selecting a first removable module from a selection of removable modules, at least two of which being interchangeable with each other;
   inserting said first removable module into a receptacle having direct connection to a microprocessor of said irrigation control apparatus, whereby said first removable module does not increase an overall size of said irrigation control apparatus;
   selecting a second removable module from said selection of removable modules;
   inserting said second removable module into said receptacle having a direct connection to said microprocessor and being adjacent said first removable module whereby said second removable module does not increase said overall size of said irrigation control apparatus;

connecting irrigation stations to said selected first and second removable modules of said irrigation control apparatus;

powering said selected first and second removable modules through said connection to said microprocessor with sufficient power to actuate solenoids of said irrigation stations; and sheltering said first and second removable modules from an outside environment by securing a panel over said first and second removable modules.

5. A method of adapting an irrigation control apparatus to control a number of irrigation stations comprising:

selecting a first removable module from a selection of removable modules, at least two of which being interchangeable with each other;

inserting said first removable module into a receptacle having direct connection to a microprocessor of said irrigation control apparatus, whereby said first removable module does not increase an overall size of said irrigation control apparatus;

selecting a second removable module from said selection of removable modules;

inserting said second removable module into said receptacle having a direct connection to said microprocessor and being adjacent said first removable module whereby said second removable module does not increase said overall size of said irrigation control apparatus;

connecting irrigation stations to said selected first and second removable modules of said irrigation control apparatus;

powering said selected first and second removable modules through said connection to said microprocessor with sufficient power to actuate solenoids of said irrigation stations; and connecting a rain switch to said irrigation control apparatus so as to cause the cessation of operation of said irrigation control apparatus in the event of rain.

6. A method of adapting an irrigation control apparatus to control a number of irrigation stations comprising:

selecting a first removable module from a selection of removable modules, at least two of which being interchangeable with each other;

inserting said first removable module into a receptacle having direct connection to a microprocessor of said irrigation control apparatus, whereby said first removable module does not increase an overall size of said irrigation control apparatus;

selecting a second removable module from said selection of removable modules;

inserting said second removable module into said receptacle having a direct connection to said microprocessor and being adjacent said first removable module whereby said second removable module does not increase said overall size of said irrigation control apparatus;

connecting irrigation stations to said selected first and second removable modules of said irrigation control apparatus; and powering said selected first and second removable modules through said connection to said microprocessor with sufficient power to actuate solenoids of said irrigation stations;

wherein each removable module of said selection of removable modules has a printed circuit board circuitry for activating a solenoid of an irrigation station.

7. A method of adapting an irrigation control apparatus to control a number of irrigation stations comprising:

selecting a first removable module from a selection of removable modules, at least two of which being interchangeable with each other;

inserting said first removable module into a receptacle having direct connection to a microprocessor of said irrigation control apparatus, whereby said first removable module does not increase an overall size of said irrigation control apparatus;

selecting a second removable module from said selection of removable modules;

inserting said second removable module into said receptacle having a direct connection to said microprocessor and being adjacent said first removable module whereby said second removable module does not increase said overall size of said irrigation control apparatus;

connecting irrigation stations to said selected first and second removable modules of said irrigation control apparatus;

powering said selected first and second removable modules through said connection to said microprocessor with sufficient power to actuate solenoids of said irrigation stations; and covering said selected first and second removable modules of said irrigation control apparatus with a front panel assembly, said front panel assembly having operational controls mounted there on.

8. A method of adapting an irrigation control apparatus to control a number of irrigation stations comprising:

selecting a first removable module from a selection of removable modules, at least two of which being interchangeable with each other;

inserting said first removable module into a first receptacle having direct connection to a microprocessor of said irrigation control apparatus, whereby said first removable module does not increase an overall size of said irrigation control apparatus;

selecting a second removable module from said selection of removable modules;

inserting said second removable module into a second receptacle having a direct connection to said microprocessor and being adjacent said first removable module whereby said second removable module does not increase said overall size of said irrigation control apparatus;

connecting irrigation stations to said selected first and second removable modules of said irrigation control apparatus; and powering said selected first and second removable modules through said connection to said microprocessor with sufficient power to actuate solenoids of said irrigation stations;

wherein a space separates said first receptacle from said microprocessor.

9. A method of expanding a number of stations controlled by an irrigation controller comprising:

providing an irrigation controller having a plurality of slots, each of said slots having one or more contacts, wherein said one or more contacts are located at one end of each of said slots and in communication with a microprocessor for storing and executing a watering program for controlling said stations, and wherein each of said slots include at least one alignment member;

providing a plurality of removable station modules wherein each station module includes at least one guide surface and connector;
aligning said guide surface of each of said removable station modules with said alignment member of a corresponding slot;
inserting each of said removable station modules to be slidably received within said corresponding slot;
coupling said connector of each of said removable station modules to said one or more contacts of said corresponding slot;
powering each of said removable station modules through said one or more contacts with sufficient power to activate solenoids of said stations; and
sheltering said removable station modules from an outside environment by securing a panel over said removable station modules.

10. A method of expanding a number of stations controlled by an irrigation controller comprising:
providing an irrigation controller having a plurality of slots, each of said slots having one or more contacts, wherein said one or more contacts are located at one end of each of said slots and in communication with a microprocessor for storing and executing a watering program for controlling said stations, and wherein each of said slots include at least one alignment member;
providing a plurality of removable station modules wherein each station module includes at least one guide surface and connector;
aligning said guide surface of each of said removable station modules with said alignment member of a corresponding slot;
inserting each of said removable station modules to be slidably received within said corresponding slot;
coupling said connector of each of said removable station modules to said one or more contacts of said corresponding slot;
powering each of said removable station modules through said one or more contacts with sufficient power to activate solenoids of said stations;
wherein providing a plurality of removable station modules includes providing removable station modules each having a generally rectangular base secured to a generally tapered top.

11. The method of claim 10, wherein providing a plurality of removable station modules includes providing removable station modules wherein said base and top of each of said removable station modules are separable.

12. A method of expanding a number of stations controlled by an irrigation controller comprising:
providing an irrigation controller having a plurality of slots, each of said slots having one or more contacts, wherein said one or more contacts are located at one end of each of said slots and in communication with a microprocessor for storing and executing a watering program for controlling said stations, and wherein each of said slots include at least one alignment member;
providing a plurality of removable station modules wherein each station module includes at least one guide surface and connector;
aligning said guide surface of each of said removable station modules with said alignment member of a corresponding slot;
inserting each of said removable station modules to be slidably received within said corresponding slot;
coupling said connector of each of said removable station modules to said one or more contacts of said corresponding slot; and
powering each of said removable station modules through said one or more contacts with sufficient power to activate solenoids of said stations;
wherein each of said removable station modules includes printed circuit board circuitry for activating a solenoid of a station.

13. A method of expanding a number of stations controlled by an irrigation controller comprising:
providing an irrigation controller having a plurality of slots, each of said slots having one or more contacts, wherein said one or more contacts are located at one end of each of said slots and in communication with a microprocessor for storing and executing a watering program for controlling said stations, and wherein each of said slots include at least one alignment member;
providing a plurality of removable station modules wherein each station module includes at least one guide surface and connector;
aligning said guide surface of each of said removable station modules with said alignment member of a corresponding slot;
inserting each of said removable station modules to be slidably received within said corresponding slot;
coupling said connector of each of said removable station modules to said one or more contacts of said corresponding slot;
powering each of said removable station modules through said one or more contacts with sufficient power to activate solenoids of said stations; and
covering said removable station modules with a front panel assembly of said irrigation controller, said front panel assembly having operational controls mounted thereon.

14. A method of expanding a number of stations controlled by an irrigation controller comprising:
providing an irrigation controller having a plurality of slots, each of said slots having one or more contacts, wherein said one or more contacts are located at one end of each of said slots and in communication with a microprocessor for storing and executing a watering program for controlling said stations, and wherein each of said slots include at least one alignment member;
providing a plurality of removable station modules wherein each station module includes at least one guide surface and connector;
aligning said guide surface of each of said removable station modules with said alignment member of a corresponding slot;
inserting each of said removable station modules to be slidably received within said corresponding slot;
coupling said connector of each of said removable station modules to said one or more contacts of said corresponding slot; and
powering each of said removable station modules through said one or more contacts with sufficient power to activate solenoids of said stations: and,
wherein a space separates said slots from said microprocessor.

* * * * *